(12) United States Patent
Kim et al.

(10) Patent No.: US 9,764,271 B2
(45) Date of Patent: Sep. 19, 2017

(54) FILTER UNIT FOR CANISTER

(71) Applicants: Hyundai Motor Company, Seoul (KR); Kia Motors Corporation, Seoul (KR)

(72) Inventors: Chang Han Kim, Gwanju (KR); Jae Min Lee, Gongju-Si (KR); Myeong Hwan Kim, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/951,986

(22) Filed: Nov. 25, 2015

(65) Prior Publication Data

US 2016/0296876 A1  Oct. 13, 2016

(30) Foreign Application Priority Data

Apr. 13, 2015  (KR) .......................... 10-2015-0051933

(51) Int. Cl.
*B01D 53/04* (2006.01)
*F02M 25/08* (2006.01)

(52) U.S. Cl.
CPC ..... *B01D 53/0423* (2013.01); *F02M 25/0854* (2013.01); *B01D 2253/102* (2013.01); *B01D 2257/702* (2013.01); *B01D 2259/4516* (2013.01); *B01D 2259/4566* (2013.01)

(58) Field of Classification Search
CPC .......... B01D 53/0415; B01D 2253/102; B01D 2259/4516; F02M 25/08; F02M 25/0854

USPC ............................ 96/134, 139, 154; 123/519
See application file for complete search history.

(56) References Cited

U.S. PATENT DOCUMENTS

| | | | | |
|---|---|---|---|---|
| 4,750,923 A | * | 6/1988 | Haruta | B01D 53/0415 55/319 |
| 4,758,255 A | * | 7/1988 | Yamada | B01D 53/0407 123/519 |
| 2009/0266236 A1 | * | 10/2009 | Kosugi | B01D 53/0415 96/152 |
| 2011/0214572 A1 | * | 9/2011 | Hasegawa | B01D 53/02 96/122 |
| 2012/0234301 A1 | * | 9/2012 | Takamatsu | F02M 25/0854 123/519 |

FOREIGN PATENT DOCUMENTS

| | | |
|---|---|---|
| JP | 57-8345 A | 1/1982 |
| JP | 57-48324 A | 3/1982 |
| JP | 63-90656 A | 4/1988 |
| JP | 6-53748 U | 7/1994 |
| JP | 7-12017 A | 1/1995 |
| KR | 0124898 Y1 | 1/1996 |

(Continued)

*Primary Examiner* — Frank Lawrence
(74) *Attorney, Agent, or Firm* — Morgan, Lewis & Bockius LLP

(57) ABSTRACT

A filter unit for a canister, which is disposed in a canister and removes foreign substances or powder in air flowing into or discharged from an air port may include a main filter that is a plate connected in a ring shape between an air port and activated carbon to pass air laterally, and configured to filter foreign substances or powder in air, and a top cover thermally bonded to a top of the main filter and configured to transversely distribute air flowing inside through the air port.

10 Claims, 14 Drawing Sheets

→ AIR BEFORE FILTERING
⇢ AIR AFTER FILTERING

(56) References Cited

FOREIGN PATENT DOCUMENTS

| | | |
|---|---|---|
| KR | 20-0179584 Y1 | 2/2000 |
| KR | 10-2009-0094567 A | 9/2009 |
| KR | 10-1040965 B1 | 6/2011 |

* cited by examiner

FILTER UNIT FOR CANISTER

CROSS-REFERENCE TO RELATED APPLICATION

The present application claims under priority to Korean Patent Application No. 10-2015-0051933 filed on Apr. 13, 2015, the entire contents of which is incorporated herein for all purposes by this reference.

BACKGROUND OF THE INVENTION

Field of the Invention

The present disclosure relates to a filter unit for a canister. More particularly, it relates to a filter unit for a canister which can prevent a filter from being clogged with dirt or powder (canister active carbon powder) and can reduce bleed emission under regulations about evaporation gas.

Description of Related Art

In general, the fuel system of vehicles using gasoline fuel in vehicles includes a fuel tank that keeps fuel, a fuel pump that pumps the fuel in the fuel tank to an engine, a fuel filter that removes foreign substances in the fuel supplied to the engine, and a fuel line that guides the fuel to the engine.

Meanwhile, gasoline fuel produces a large amount of fuel evaporation gas due to evaporation (Hydrocarbon gas, hereafter, referred to as an HC gas) and it causes a loss of fuel and contaminates the atmosphere.

Accordingly, a canister that collects and keeps an HC gas generated from a fuel tank is necessarily used in order to solve this problem.

A canister 10, as illustrated in FIG. 1, is achieved by filling a case 11 having a predetermined volume with an adsorptive substance that can adsorb an HC gas evaporating from a fuel tank keeping gasoline fuel, in which an activated carbon 16 is generally used as the adsorptive substance.

The canister 10 adsorbs an HC gas on the activated carbon 16 with an engine stopped, but when the engine is in operation, the HC gas adsorbed on the activated carbon 16 is diffused by the pressure of air taken inside through an air port 12 and supplied to the engine along a fuel system through a purge port 13.

However, according to FIG. 2 illustrating operation of a canister 10 of the related art, while air flowing into an air port 12 passes an air filter 15 and discharges an HC gas adsorbed on activated carbon 16 in the canister 10 through a purge port 13, with a vehicle driven, foreign substances in external air clogs the air filter 15.

According to FIG. 3 illustrating operation of a canister 10 of the related art, when air in a fuel tank is discharged to an air port 12 through a load port 14 in fueling, powder of activated carbon 16 passing through the canister 10 clogs an air filter 15.

In these two cases, when the air filter 15 is clogged, explosive vibration by an engine is fully transmitted to the fuel tank, so the fuel tank cracks and air cannot smoothly flows inside, which causes frequent stop of the engine.

Accordingly, when the air filter 15 of the canister 10 is clogged, it is required to replace the canister for the safe of the vehicle, so the maintenance cost increases.

With an increase in environmental pollution, recently, many countries have enhanced evaporation emission regulations and tailpipe emission regulations as well.

The evaporation emission regulations regulate emission of an HC gas from a fuel tank of a vehicle to the atmosphere due to natural evaporation in order to reduce environmental pollution by minimizing a loss of fuel naturally discharged to the atmosphere when a vehicle is stopped/parked and driven as well.

A typical part for the regulations is the canister 10 that most effectively reducing an evaporation gas.

However, the canister 10 of the related art, as illustrated in FIG. 4, when the activated carbon 16 in the canister absorbs an HC gas and the concentration increases, an evaporation gas is necessarily diffused by the difference in concentration in the canister 10. Further, when the capacity of the canister 10 is small, bleed emission (hereafter, referred to as 'BLEED EM') increases.

In this case, it is effective to increase the amount of an HC gas that can be collected, by increasing the capacity of the activated carbon 16 in order to reduce the BLEED EM of the canister 10, but the cost increases and the size of the canister increase and the canister is difficult to be mounted, so this method is not used.

In order to reduce BLEED EM by increasing the cross-sectional area and the length of a passage through which an evaporation gas passes, it is possible to install a separator or insert a cylindrical pipe, but in this case, ventilation resistance increases and spit back, a phenomenon that fuel flows backward in fueling, is caused.

Accordingly, the HC gas that is not adsorbed on the activated carbon 16 is easily discharged to the outside through the air port 12, so the evaporation emission regulations are not satisfied due to BLEED EM.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a filter unit for a canister that can minimize clogging of a filter due to foreign substances or powder and minimize bleed emission according to evaporation emission regulations, by maximizing a filtering area by diffusing air in a canister adjacent to an air port.

According to various aspects of the present invention, a filter unit for a canister, which is disposed in a canister and removes foreign substances or powder in air flowing into or discharged from an air port may include a main filter that is a plate connected in a ring shape between an air port and activated carbon to pass air laterally, and configured to filter foreign substances or powder in air, and a top cover thermally bonded to a top of the main filter and configured to transversely distribute air flowing inside through the air port.

The filter unit may further include a lower cover thermally bonded to a bottom of the main filter and having a plurality of first diffusion holes through which air passing through the main filter flows to the activated carbon.

The filter unit may further include a sub-filter disposed under the lower cover and configured to prevent the activated carbon from flowing into the first diffusion holes.

The first diffusion holes of the lower cover may increase in diameter as they go to edges from a center of the lower cover to guide air to the edges of the sub-filter.

A space for receiving the sub-filter may be formed under the lower cover and a skirt inclined downward and open outward may be formed around the lower cover to be fitted in an air-side insertion hole of the case.

According to various aspects of the present invention, a filter unit for a canister, which is disposed in a canister and removes foreign substances or powder in air flowing into or discharged from an air port may include a main filter disposed between an air port and activated carbon and configured to filter foreign substances or powder in air, and a diffusion plate disposed over the main filter and having a plurality of second diffusion holes for diffusing air flowing inside through the air port.

The filter unit may further include a filter support plate coupled to extension flanges formed at a bottom of the diffusion plate and horizontally supporting the main filter.

The main filter may be longitudinally continuously curved to increase a filtering area.

The second diffusion holes of the diffusion plate may increase in diameter as they go to edges from a center of the diffusion plate to guide air to the edges of the main filter.

Spacing protrusions supported on an inner side of the case may be further formed at corners of the diffusion plate to form a space from the air port.

By providing the present invention having the configuration described above, it is possible to preclude cracks in a fuel tank and stopping of an engine by preventing clogging of a filter by foreign substances or powder, so it is possible to reduce the maintenance cost.

It can be expected to minimize damage due to environmental pollution and a loss of fuel of a vehicle by reducing bleed emission according to evaporation emission regulations.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention proposes various embodiments of a filter unit 100 for a canister 10 which is disposed in the canister 10 and removes foreign substances or powder in an air flowing into or discharged from an air port 12.

Figure 1:
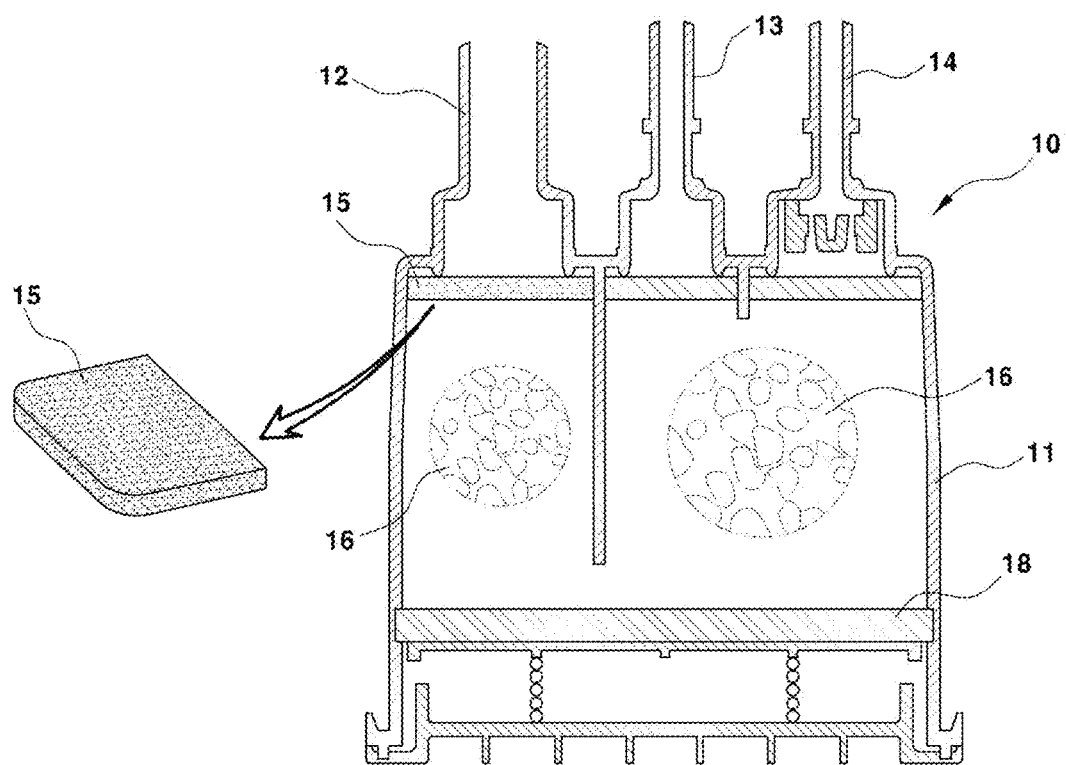
FIG. 1 is a view illustrating a cross-section of a canister of the related art.
Figure 2:
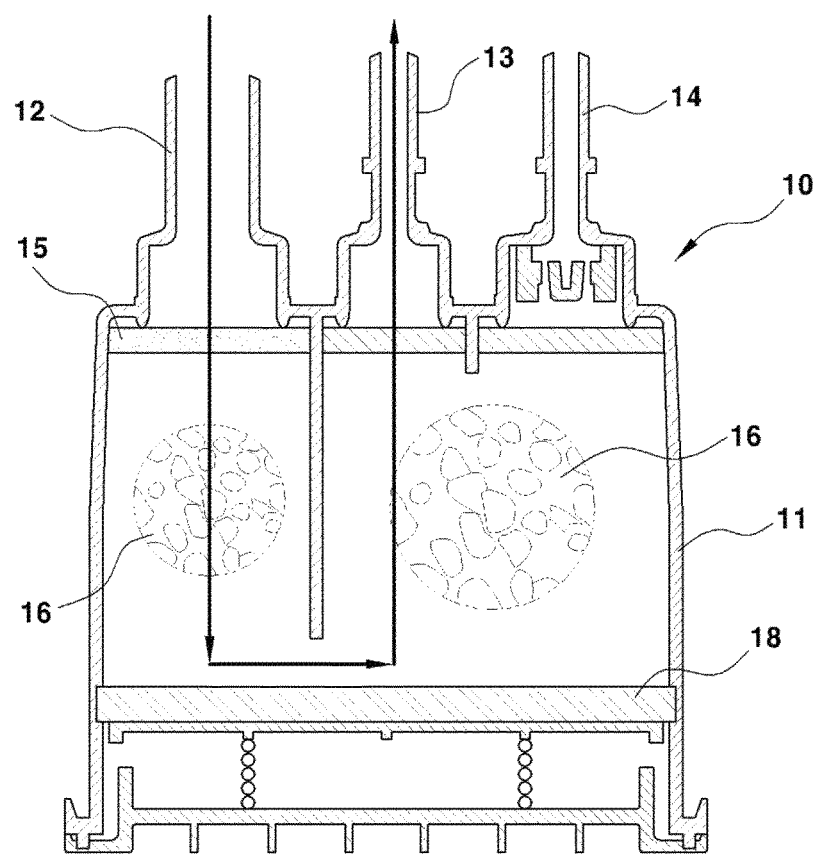
FIG. 2 is a view illustrating operation of a canister of the related art when a vehicle is driven.
Figure 3:
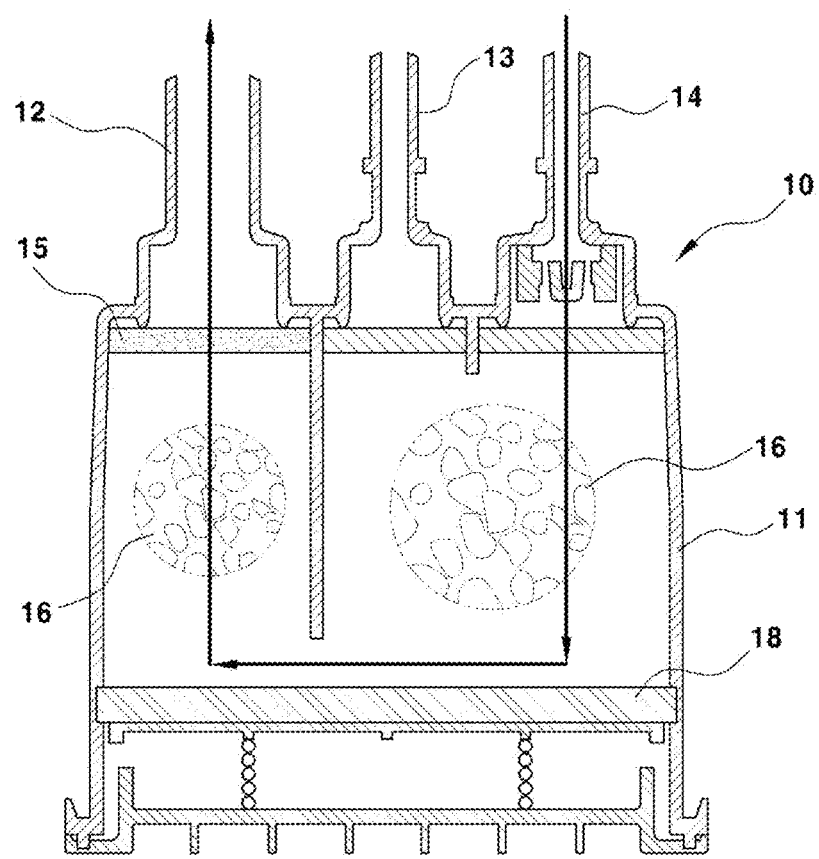
FIG. 3 is a view illustrating operation of a canister of the related art when a vehicle is fueled.
Figure 4A:
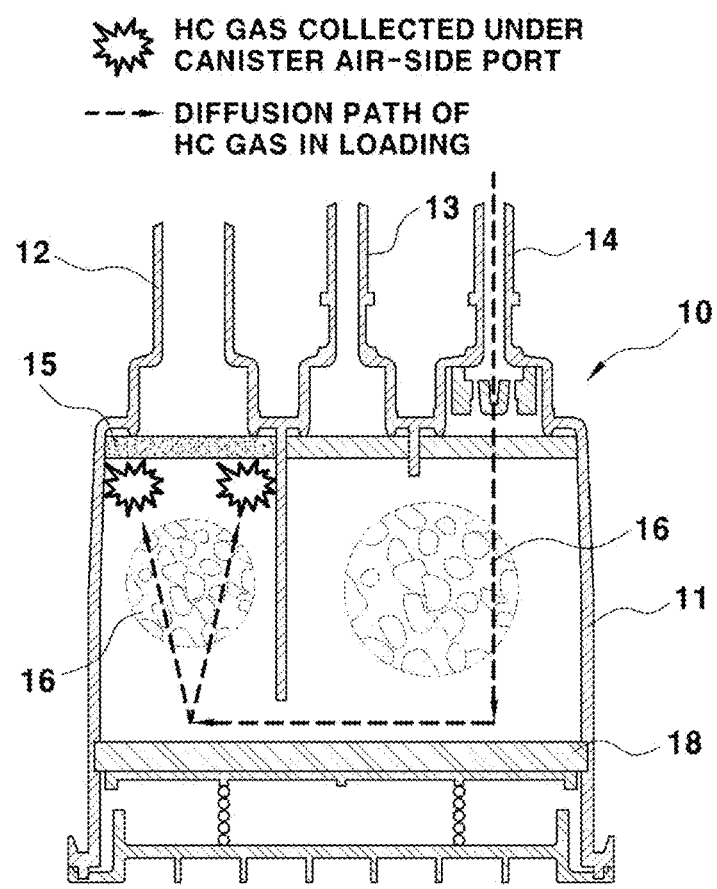
FIGS. 4A to 4C are views illustrating purge efficiency deterioration due to clogging of an air filter in a canister of the related art.
Figure 4B:
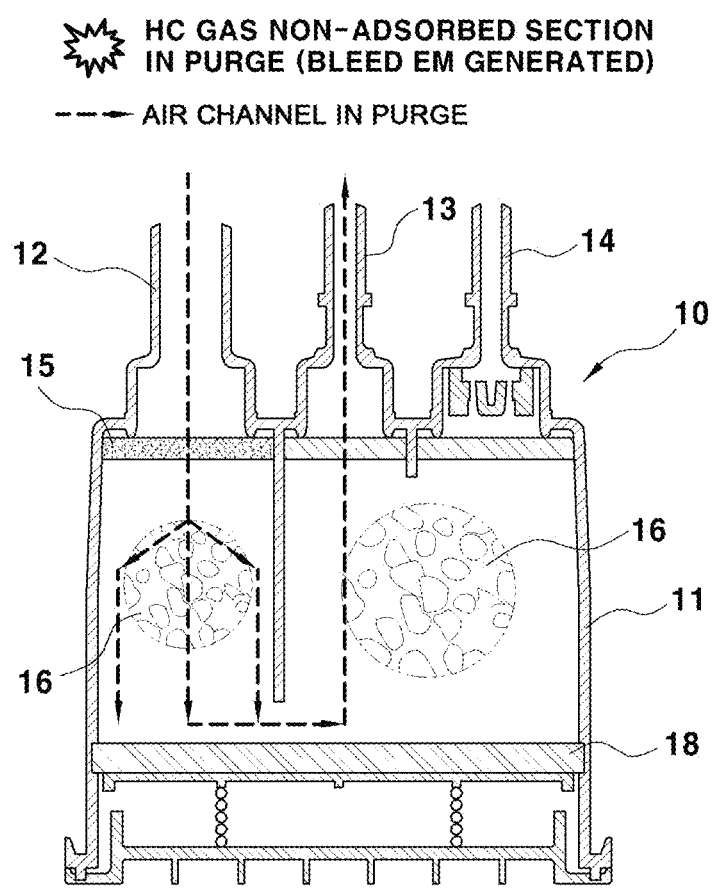
Figure 4C:
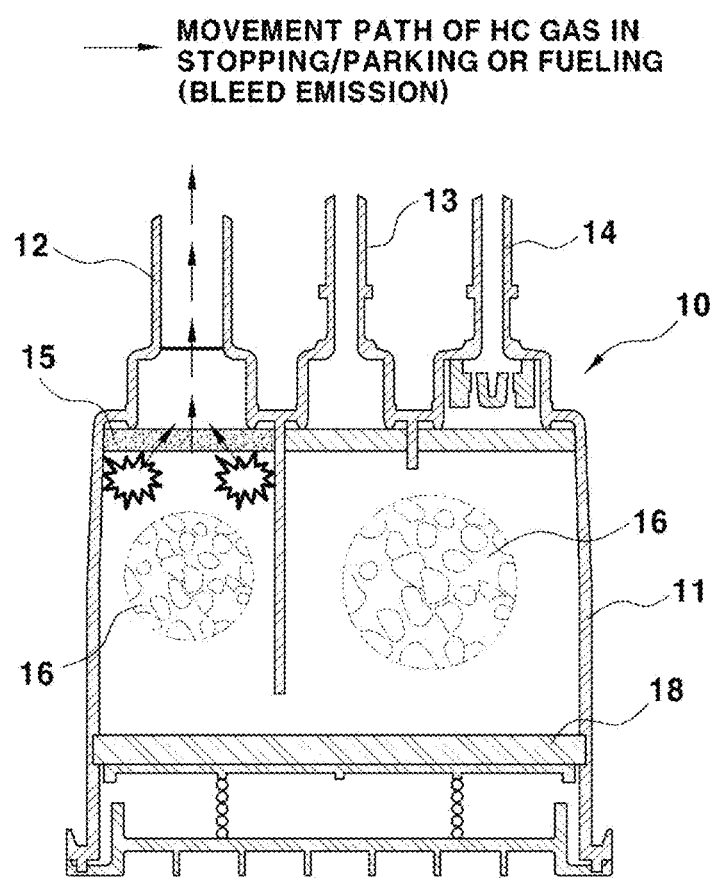
Figure 5A:
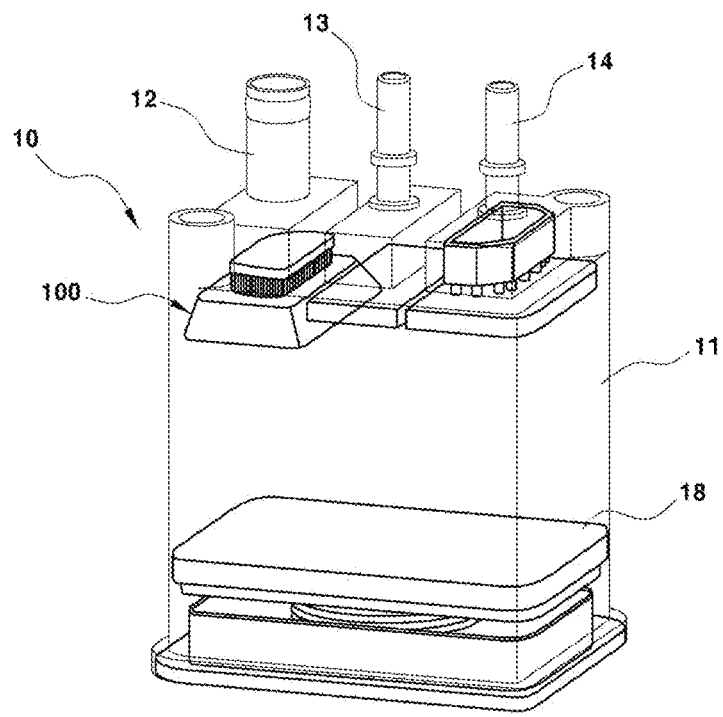
FIG. 5A and FIG. 5B are views illustrating the configuration of an exemplary filter unit for a canister according to the present invention.
Figure 5B:
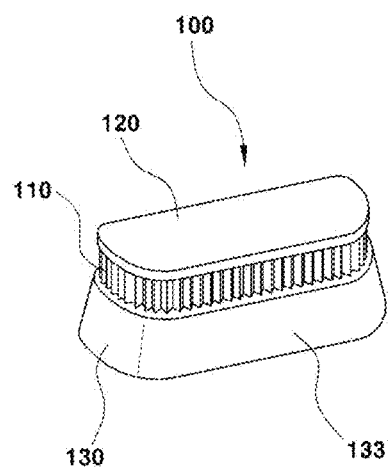
Figure 6:
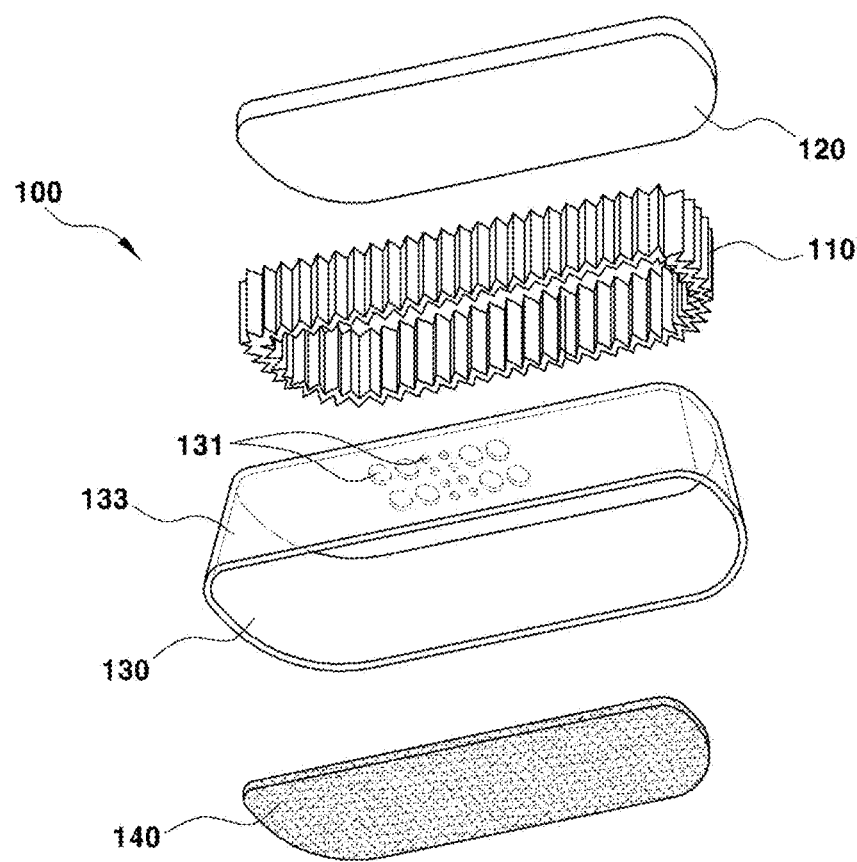
FIG. 6 is an exploded view of the exemplary filter unit for a canister according to the present invention.

A filter unit 100 for a canister of the present invention, as illustrated in FIGS. 5A, 5B and 6 which illustrate the configuration of various embodiments and the exploded configuration of the various embodiments, respectively, firstly includes a main filter 110 that is a plate connected in a ring shape between an air port 12 and activated carbon 16 to pass air laterally and filtering foreign substances or powder in air.

Herein, a top cover 120 for transversely distributing air flowing inside through an air port 12 is thermally bonded to the top of the main filter 110.

By the top cover 120, air flowing inside through the air port 12 does not directly passes through the main filter 110, but hits against the top cover 120 to widely spread throughout the top cover 120 and passes through the main filter 110.

Accordingly, as air flows around the top cover 120, so filtering efficiency of the main filter 110 can be maximized.

Herein, the air port 12 and the top cover 120 may be disposed at a predetermined distance from each other for smooth airflow.

A lower cover 130 having a plurality of first diffusion holes 131 to allow air passing through the main filter 110 to flow to activated carbon 16 is thermally bonded to the bottom of the main filter 110.

That is, the air that has passed through the main filter 110 flows to the activated carbon 16 disposed at the bottom through the first diffusion holes 131 of the lower cover 130.

A sub-filter 140 for preventing the activated carbon 16 from flowing into the first diffusion holes 131 is disposed under the lower cover 130, and these components are combined.

Herein, the sub-filter 140 can preclude a loss of the activated carbon 16 through the air port 12 and secondarily filters the air primarily filtered through the main filter 110, so air to be supplied to an engine can keep clean.

Meanwhile, a space for stably receiving the sub-filter 140 is formed under the lower cover 130 and a skirt 133 inclined downward and open outward is formed around the lower cover 130 to be fitted in an air-side insertion hole 17 of the case 11.

That is, the filter unit 100 that is a single unit assembled by thermal bonding by the skirt 133 can be firmly fitted in the insertion hole 17 and fixed without moving by an elastic panel 18 disposed at the lower portion of the case 11 and bringing the activated carbon 16 in close contact with the filter unit 100.

Figure 8:
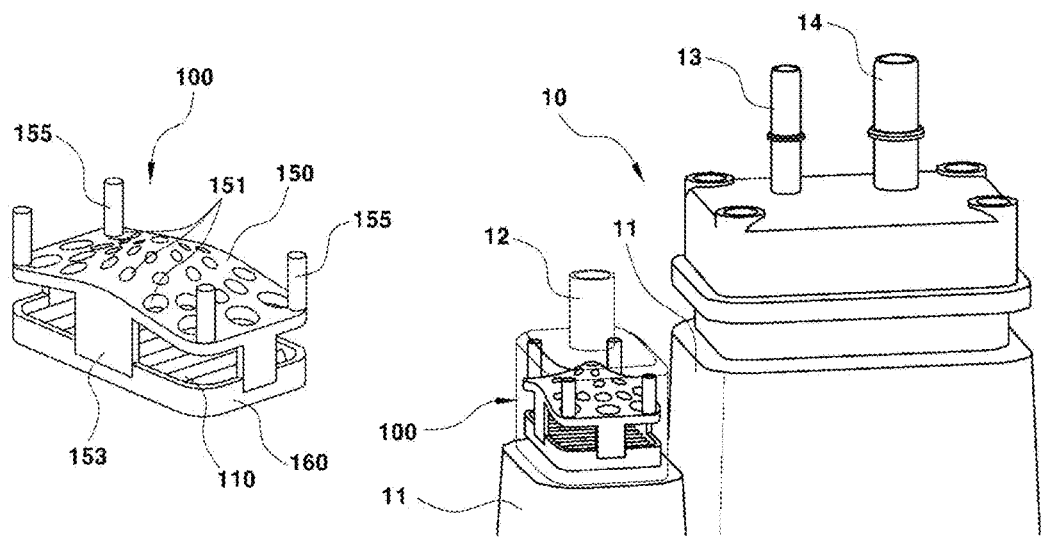
FIG. 8 is a view illustrating the configuration an exemplary filter unit for a canister according to the present invention.
Figure 9:
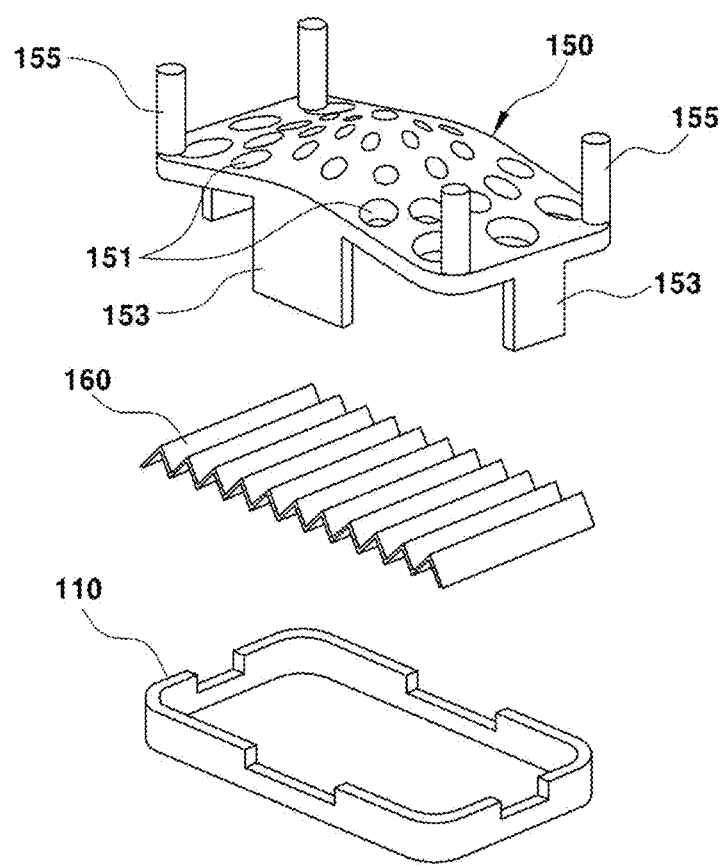
FIG. 9 is an exploded view of the exemplary filter unit for a canister according to the present invention.

A filter unit 100 for a canister of the present invention, as illustrated in FIGS. 8 and 9 which illustrate the configuration of various embodiments and the exploded configuration of the various embodiments, respectively, firstly includes a main filter 110 that is disposed between an air port 12 and activated carbon 16 to filter foreign substances or powder in air.

A diffusion plate 150 having a plurality of second diffusion holes 151 for diffusion air flowing inside through the air port 12 is disposed over the main filter 110.

Accordingly, the air flowing inside through the air port 12 hits against the diffusion plate 150 and is uniformly filtered throughout the main filter 110 through the second diffusion holes 151, so filtering efficiency can be maximized.

Extension flanges 153 are coupled to the bottom of the diffusion plate 150, a filter support plate 160 horizontally supporting the main filter 110 is provided, and these components are combined.

Herein, the filter support plate 160 may be formed in a band shape with a hole at the center to support only the edge of the main filter 110 or may be formed in a net shape to support the bottom of the main filter 110.

Spacing protrusions 155 supported on the inner side of the case 11 may be further formed at the corners of the diffusion plate 150 to form a space from the air port 12.

The spacing protrusions 155 are fixed by a piece fastened to the top of the case 11 by the spacing protrusions 155, so the filter unit 100 that is a single unit can be disposed adjacent to the air port 12.

It is very preferable that the main filter 110 is continuously curved longitudinally to maximize the filtering area for removing foreign substances in air.

The first and second diffusion holes 131 and 151 formed through the lower cover 130 or the diffusion plate 150 may increase in diameter as they go to the edges from the center to guide air to the edges of the main filter 110 or the sub-filter 140.

Herein, assuming that the first and second diffusion holes 131 and 151 having smaller diameters at the center are center diffusion portion A and the first and second diffusion holes 131 and 151 having larger diameters around the edges are edge diffusion portion B, when air passes through the center diffusion portion A at a high speed through the air port 12, it cannot flows at a high flow rate, but passes through the edge diffusion portion B due to the smaller diameters.

As a result, air can be distributed and pass through the entire edge diffusion portion B at a high flow rate, so the entire areas of the main filter 110 and the sub-filter 140 can be used, and accordingly, the filter efficiency can be maximized.

The detailed operation of the various embodiments of the present invention having the configuration described above is described with reference to the accompanying drawings.

Figure 7A:
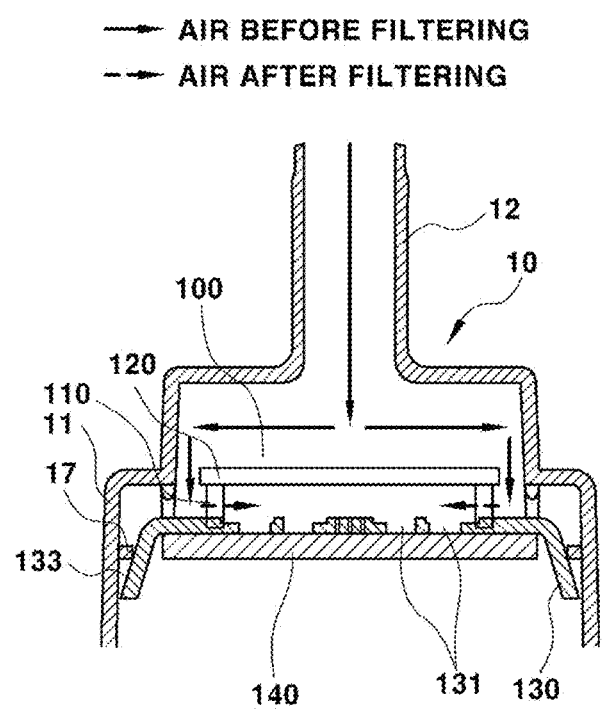
FIGS. 7A to 7C are views illustrating the operation of the exemplary filter unit for a canister according to the present invention.

First, in the various embodiments, as illustrated in FIG. 7A illustrating the operation of the various embodiments of FIGS. 5A-7C, air flowing into the case 11 of the canister 10 along the air port 12 hits against the top cover 120, spreads radially on the surface, and passes through the space between the case 11 and the top cover 120.

Figure 7B:
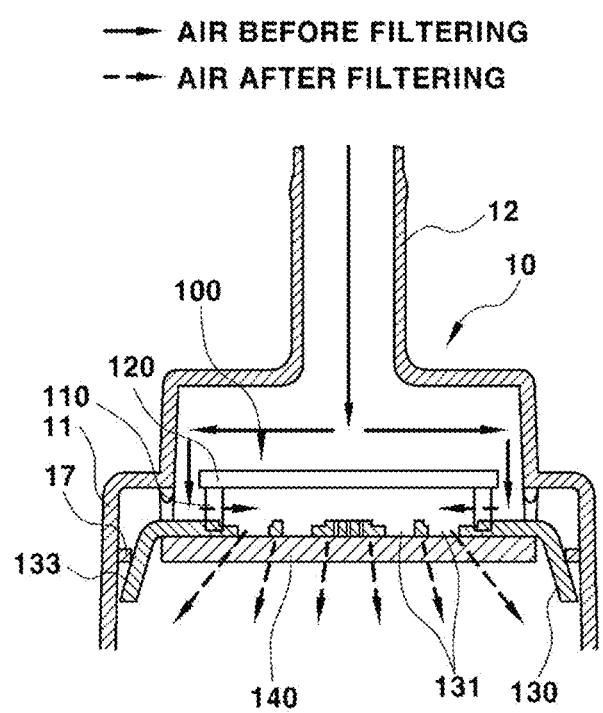

In FIG. 7B, the air spreads around the top cover 120 passes through the main filter 110 thermally bonded between the top cover 120 and the lower cover 130 and collects to the center with primarily filtering.

Figure 7C:
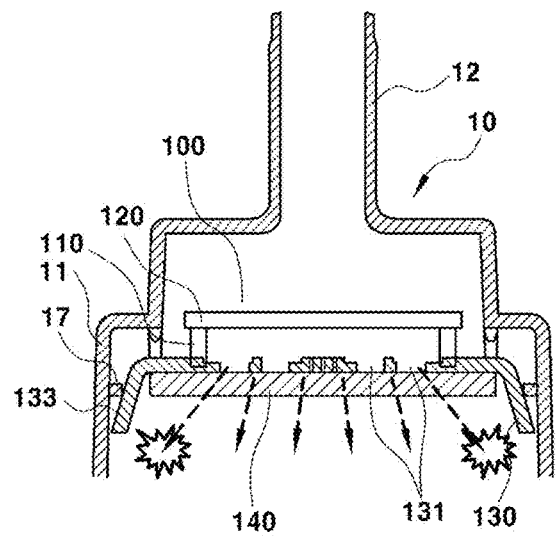

Thereafter, in FIG. 7C, the air is secondarily filtered by the sub-filter 140 through the first spread hole 131 of the lower cover 130.

Accordingly, as in FIGS. 7A, 7B, and 7C, air sequentially flows and is filtered two times, so air as clean as possible can be obtained. Further, the air concentrating at the center through the first diffusion holes 131 uniformly spreads throughout the activated carbon 16, so the HC gas can be easily spread and discharged, thereby preventing BLEED EM.

Figure 10A:
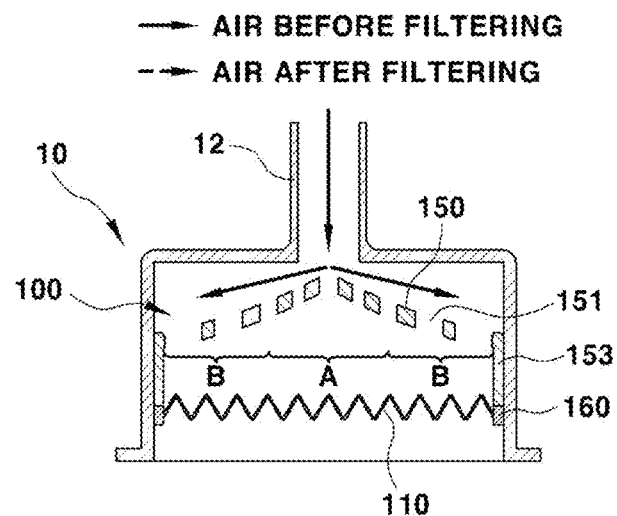
FIG. 10A and FIG. 10B are views illustrating the operation of the exemplary filter unit for a canister according to the present invention.
Figure 10B:
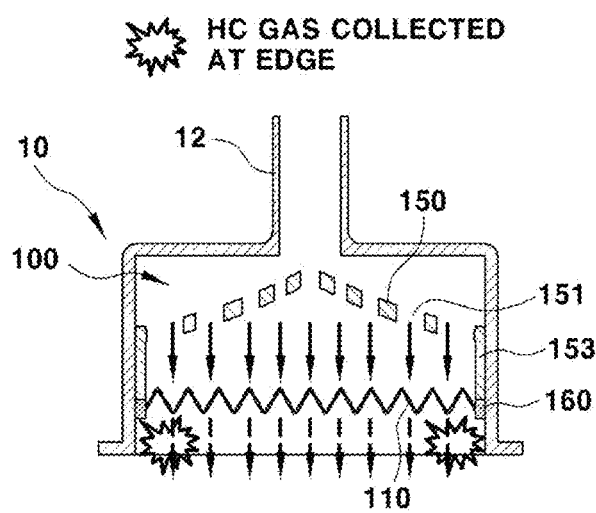

In the various embodiments, as illustrated in FIGS. 10A and 10B illustrating the operation of the various embodiments, air flowing into the case 11 of the canister 10 along the air port 12, as in FIG. 10A, hits against the diffusion plate 150 and spreads to the edges through the second diffusion holes 151.

Herein, the air is guided to the edges through the edge diffusion portion B having diameters relatively larger than the diameters of the center diffusion portion A at the center in the second diffusion holes 151 of the diffusion plate 150, the entire area of the main filter 110 can be used, as in FIG. 10B, and accordingly, optimum filtering efficiency can be achieved.

The air concentrating at the center is spread throughout the activated carbon 16 and the HC gas is easily diffused and discharged by the edge diffusion portion B, so BLEED EM is prevented.

Figure 11:
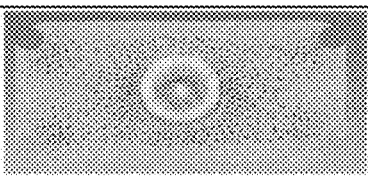
FIG. 11 is a table for comparing airflow when an air filter for a canister of the related art and a filter unit for a canister of the present invention were used.

As can be seen from FIG. 11 comparing the filtering areas of an air filter of a canister of the related art and a filter of the filter unit 110 for a canister of the present invention, in which the main filter 110 or the sub-filter 140 filtered air by applying the various embodiments of the present invention, the filter area can uniformly used, so the lifespan of the filter can be further extended in comparison to the related art and accordingly it is effective in reducing a cost.

By providing the present invention having the configuration described above, it is possible to preclude cracks in a fuel tank and stopping of an engine by preventing clogging of a filter by foreign substances or powder, so it is possible to reduce the maintenance cost.

It can be expected to minimize damage due to environmental pollution and a loss of fuel of a vehicle by reducing BLEED EM according to evaporation emission regulations.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A filter unit for a canister, which is disposed in a canister and removes foreign substances or powder in air flowing into or discharged from an air port, the filter unit comprising:
    a main filter that is a plate connected in a ring shape between an air port and activated carbon to pass air laterally, and configured to filter foreign substances or powder in air; and
    a top cover thermally bonded to a top of the main filter and configured to transversely distribute air flowing inside through the air port.

2. The filter unit of claim 1, further comprising:
    a lower cover thermally bonded to a bottom of the main filter and having a plurality of diffusion holes through which air passing through the main filter flows to the activated carbon.

3. The filter unit of claim 2, further comprising:
    a sub-filter disposed under the lower cover and configured to prevent the activated carbon from flowing into the diffusion holes.

4. The filter unit of claim 2, wherein the diffusion holes of the lower cover increase in diameter as they go to edges from a center of the lower cover to guide air to the edges of the sub-filter.

5. The filter unit of claim 3, wherein a space for receiving the sub-filter is formed under the lower cover and a skirt inclined downward and open outward is formed around the lower cover to be fitted in an air-side insertion hole of a case.

6. The filter unit of claim 1, wherein the main filter is longitudinally continuously curved to increase a filtering area.

7. A filter unit for a canister, which is disposed in a canister and removes foreign substances or powder in air flowing into or discharged from an air port, the filter unit comprising:
    a main filter disposed between an air port and activated carbon and configured to filter foreign substances or powder in air;
    a diffusion plate disposed over the main filter and having a plurality of diffusion holes for diffusing air flowing inside through the air port; and
    a filter support plate coupled to extension flanges formed at a bottom of the diffusion plate and horizontally supporting the main filter.

8. The filter unit of claim 7, wherein the main filter is longitudinally continuously curved to increase a filtering area.

9. The filter unit of claim 7, wherein the diffusion holes of the diffusion plate increase in diameter as they go to edges from a center of the diffusion plate to guide air to the edges of the main filter.

10. The filter unit of claim 7, wherein spacing protrusions supported on an inner side of the canister are further formed at corners of the diffusion plate to form a space from the air port.

* * * * *